This invention relates to the art of joining metals and is concerned with a compound that is particularly useful in the soldering of metals such as aluminum and its alloys. This application is a continuation-in-part of application Serial No. 343,438 filed March 19, 1953, the patentable subject matter of which was transferred to the present application before abandonment.

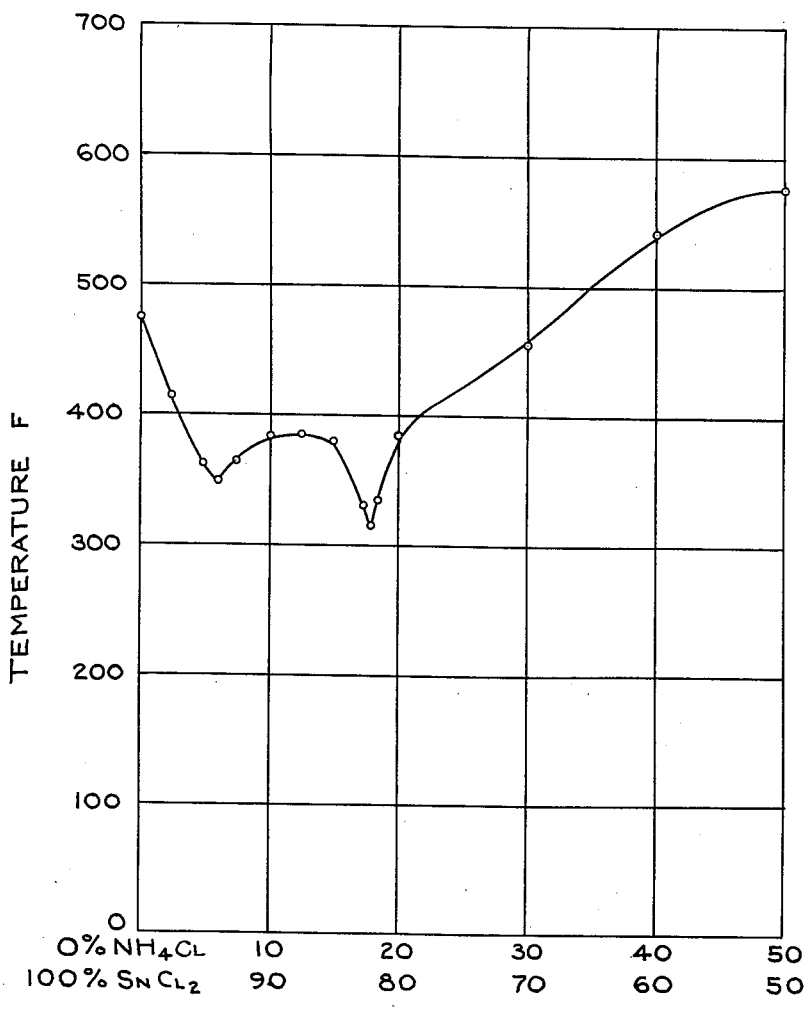
INVENTORS
GARY J. BABCOCK
DONALD C. BURCH
ROBERT L. SIMPKINS 3,008,230
FLUX AND METHOD FOR SOLDERING ALUMINUM
Gary J. Babcock, Highland Park, Donald C. Burch, Oak Park, and Robert L. Simpkins, Berkley, Mich., assignors to Essex Wire Corporation
Filed Apr. 9, 1957, Ser. No. 651,756
3 Claims. (Cl. 29—495)

The soldering of aluminum has heretofore posed a two-fold problem requiring seemingly opposed approaches. In the first instance, the material is coated with an extremely tenacious and tough oxide film. In order to obtain a reasonably effective soldered joint, this oxide film must be removed so that the solder metal is adjacent the base metal. To remove this tough oxide film, it is necessary that the flux have what is essentially strong corroding power. This in turn poses the second problem which is related to the corrosion resistance of the finished product. The fluxes previously available which had sufficient fluxing, or corroding power, to attack the oxide film had the unsatisfactory after effect of continued corrosion of the solder area. The soldered joints would fail in service not for want of soldering efficiency, but due to the continued after corrosion of the solder area. On the other hand, fluxes of lesser corroding power, so designed to minimize after corrosion, did not provide good aluminum fluxes because of poor fluxing of the aluminum oxide film.

The present invention provides a fluxing material which has sufficient corroding power to flux aluminum oxides. In addition, the flux is entirely consumed when heated to soldering temperatures and there is no unconsumed flux or corrosive residue remaining after the soldering operation. The corrosion resistance of various types of soldered joints has been carefully investigated. Such joints have been subjected to the salt-spray test (ASTM No. B-117) and, in addition, to a humidity test wherein the atmosphere is maintained at a constant 100 percent relative humidity. In each instance, the investigation showed that the flux had been entirely consumed and that no corrosive residue remained after the soldering operation.

In addition, the present invention provides for improved soldering inasmuch as it makes possible better wetting of the solder area by the solder. This improved wetting is brought about in part by the precipitation of tin by the flux. When the flux is heated to soldering temperature, it flows freely into any interstices in the solder area, fluxing metallic oxides and depositing a thin layer of tin. Most soft solders containing tin wet more readily on the thin layer of tin precipitate with the result that joints of improved efficiency are made possible. Tension tests made on lay joints, and ring-and-plug type joints show slight variation from test specimen to test specimen indicating substantial and uniform joint efficiency. In the case of thin gauge material or small size wire, the tin precipitate is sufficient to complete the soldering.

The object of our invention, therefore, is to provide a new and useful flux for soldering aluminum and its alloys.

The above and other objects, advantages, and features of our invention will appear from the detailed description.

According to my invention, the compound is formed by combining two salts; ammonium chloride ($NH_4Cl$) and stannous chloride ($SnCl_2$) in such a manner as to form a stable, non-hygroscopic molecular combination of the two salts. The method of inducing molecular combination of the $NH_4Cl$ and $SnCl_2$ is quite important. Intimate mechanical mixtures of the two salts fail to produce the desired soldering or tinning characteristics. This may be due in part to the tendency of free $NH_4Cl$ to sublime rather than to liquify. In combination with $SnCl_2$, however, $NH_4Cl$ is made available for its fluxing power.

The two salts are combined by melting them together in the proper proportions by weight and evaporating substantially all water. Either hydrous or anhydrous $SnCl_2$ may be used. The product formed is then allowed to cool and the resultant crystalline mass may then be pulverized if it is to be used as a dry flux or simply broken up if it is anticipated that it will be remelted for use.

The molecular combination of the two salts is a highly complex structure. Various proportions of the salts were prepared for development of the binary diagram shown in the figure. It can be seen from this diagram that a eutectic exists at pproximately 6 percent $NH_4Cl$ and 94 percent $SnCl_2$. In addition, a lower eutectic is indicated in the neighborhood of 18 percent $NH_4Cl$. The two eutectics indicate that a definite chemical compound results when the salts are melted together although the exact nature of the resultant chemical is indefinite.

The X-ray diffraction pattern of the 10 percent $NH_4Cl$ and 90 percent $SnCl_2$ sample contained about 75 lines, indicating a highly complex pattern, not identifiable from available standards.

Wet analyses indicate that the additive elements are present in unchanged proportions. This would indicate on a molecular basis that the resultant molecular balance is on the order of $NH_4Cl:2SnCl_2$ at least at the 12 percent $NH_4Cl$ level. However, as has been indicated, the molecular structure is extremely complex as indicated by the diffraction patterns.

Best fluxing action in the soldering of aluminum with the least amount of residues is accomplished with compounds corresponding approximately to the formula $NH_4Cl—2SnCl_2$. If properly applied, there are no visible residues remaining from the use of fused salt compounds containing 9 to 12 percent $NH_4Cl$ and the remainder $SnCl_2$. Compounds containing less than 6 percent $NH_4Cl$ or more than 18 percent $NH_4Cl$ have retarded fluxing action. Compounds containing more than approximately 18 percent by weight $NH_4Cl$ have retarded and incomplete fluxing action because of insufficient stannous chloride. Those compounds containing less than 6 percent $NH_4Cl$ have retarded fluxing action because of excessive residue formation.

In actual use, the present flux may be applied to any work in either a powder, as a liquid or as a slurry. The use of a powder can be simplified by heating the work slightly so that the powder softens and sticks to the work. When solder is applied to the work with the necessary heat, the flux liquifies at a reasonably low temperature and flows readily over the workpiece. The chlorides in the flux react with the oxides on the work piece to cleanse the metal, then on reaching a higher temperature, the flux reacts causing metallic molten tin to plate the work and to alloy with it, forming a base coat to which the molten solder quickly and readily alloys forming a true solder bond. For example, it has been found that eyelet terminals to be dip soldered, need not be completely covered with flux. A small quantity may be applied to the bottom end, either from a molten flux bath or a warm terminal dipped in powder. Upon immersing this combination in molten solder, the flux melts very quickly and flows over the terminal and into the innermost strands of the cable as the immersion proceeds. First, cleansing of the metal occurs—then the reaction occurs—plating the terminal and strands; then the solder flows over the terminal faces and up the strands, completely coating the terminal outside and inside, and completely coating each individual strand. The solder continues to flow into and completely fill the terminal cylinder.

It has been found that the flux reaction can be accelerated in the soldering operation by adding from just a trace of aluminum to 10 percent of aluminum to the solder. The upper limit of aluminum as a solder additive is that amount which causes the solder to become mushy and workable at a given operating temperature. In soldering with such a combination, the chlorides in the flux combine with the aluminum in the solder (as well as with the aluminum in the work piece, if it is used) to form aluminum chloride which passes off as a dense white cloud; this reduces the flux to metallic tin very rapidly. The tin may then plate the terminal and cable strands, or go into solution in the solder. This is an important feature in the system since it speeds up the reaction considerably; moreover, it cleans the solder surface and converts surplus flux not needed for the joint to metallic tin in the solder. The faster reaction feature would be of great value in a high volume conveyorized production setup.

As many apparently widely different embodiments of this invention may be made without departing from the spirit and scope thereof, it is to be understood that I do not limit myself to the specific embodiments thereof except as defined in the appended claims.

I claim:

1. A flux composition for soldering aluminum consisting of the product formed by fusing together a mixture of from 9 percent by weight $NH_4Cl$ and 91 percent $SnCl_2$ to 12 percent $NH_4Cl$ and 88 percent $SnCl_2$.

2. A flux composition for soldering aluminum consisting of the product formed by fusing together a mixture of from 9 percent by weight $NH_4Cl$ and 91 percent by weight $SnCl_2$ to 12 percent by weight $NH_4Cl$ and 88 percent by weight $SnCl_2$, said product consisting of compounds corresponding approximately to the formula $NH_4Cl \cdot 2SnCl_2$.

3. A process for soldering a member of aluminum metal comprising heating the aluminum metal member, applying a flux to the member, and applying solder to the fluxed area of the member; said flux consisting of the product formed by fusing together a mixture of from 9 percent by weight $NH_4Cl$ and 91 percent by weight $SnCl_2$ to 12 percent by weight $NH_4Cl$ and 88 percent by weight $SnCl_2$, said product consisting of compounds corresponding approximately to the formula $NH_4Cl \cdot 2SnCl_2$.

References Cited in the file of this patent

UNITED STATES PATENTS

| | | |
|---|---|---|
| 1,689,899 | Weber | Oct. 30, 1928 |
| 2,456,235 | Yonkman | Dec. 14, 1948 |
| 2,538,495 | Barry | Jan. 16, 1951 |
| 2,161,556 | Carroll et al. | June 6, 1951 |
| 2,616,384 | McBride | Nov. 4, 1952 |
| 2,781,577 | Smellie | Feb. 19, 1957 |
| 2,788,303 | Ballard et al. | Apr. 9, 1957 |

FOREIGN PATENTS

| | | |
|---|---|---|
| 597,206 | Great Britain | Jan. 21, 1948 |
| 642,869 | Great Britain | Sept. 13, 1950 |